United States Patent [19]

Hollobaugh

[11] 4,245,621
[45] Jan. 20, 1981

[54] STRUCTURAL BUILDING COMPONENT

[76] Inventor: George E. Hollobaugh, 1406 9th Ave. East, Bradenton, Fla. 33508

[21] Appl. No.: 908,258

[22] Filed: May 22, 1978

[51] Int. Cl.³ .............................................. F24J 3/02
[52] U.S. Cl. .................................... 126/450; 126/447; 126/448
[58] Field of Search ............... 126/270, 271, 450, 901, 126/447, 444, 443, 448, 446; 237/1 A; 52/578, 579, 94, 465

[56] References Cited

U.S. PATENT DOCUMENTS

| 1,034,465 | 8/1912 | Kennedy et al. | 126/271 |
| 1,801,240 | 4/1931 | Schaffert | 52/579 X |
| 3,991,938 | 11/1976 | Ramey | 237/1 A |
| 4,010,733 | 3/1977 | Moore | 126/271 |
| 4,055,162 | 10/1977 | Gonzalez | 126/271 |
| 4,063,544 | 12/1977 | Bowen | 126/450 |
| 4,090,494 | 5/1978 | Borst et al. | 126/450 X |
| 4,103,674 | 8/1978 | Robinson, Jr. et al. | 126/271 |
| 4,104,837 | 8/1978 | Naito | 52/579 X |
| 4,123,003 | 10/1978 | Winston | 126/270 |
| 4,123,883 | 11/1978 | Barber, Jr. et al. | 237/1 A X |
| 4,138,989 | 2/1979 | Doyle et al. | 126/450 |

FOREIGN PATENT DOCUMENTS

| 2330974 | 7/1977 | France | 126/447 |
| 220162 | 4/1968 | Sweden | 52/279 |

Primary Examiner—Samuel Scott
Assistant Examiner—Randall L. Green
Attorney, Agent, or Firm—Fisher, Gerhardt, Crampton & Groh

[57] ABSTRACT

A structural building component having an elongated trough like shell with side walls of adjacent components held together by a clamping means that prevents leakage between the panels and hold the panels against endwise movement relative to each other. The panels include solar radiation absorbing means and heat transfer means in the form of tubes which extend completely through the panel so that adjacent tubes in the same panel or in adjacent panels are connected together exterior of the panels with a gutter arrangement to conceal the exterior connections and to accumulate moisture or condensation and leakage, if any, from the connections.

3 Claims, 8 Drawing Figures

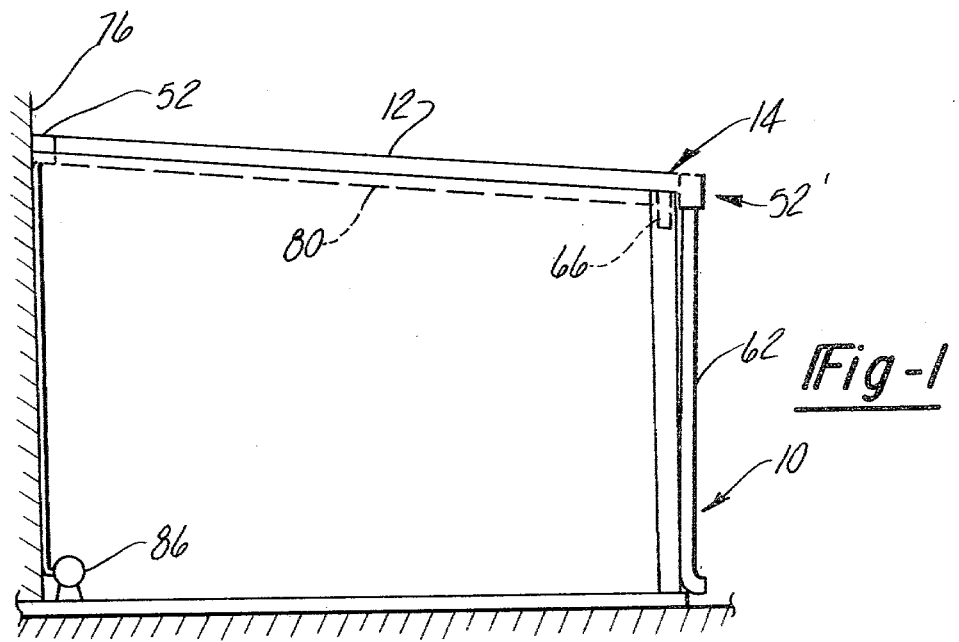
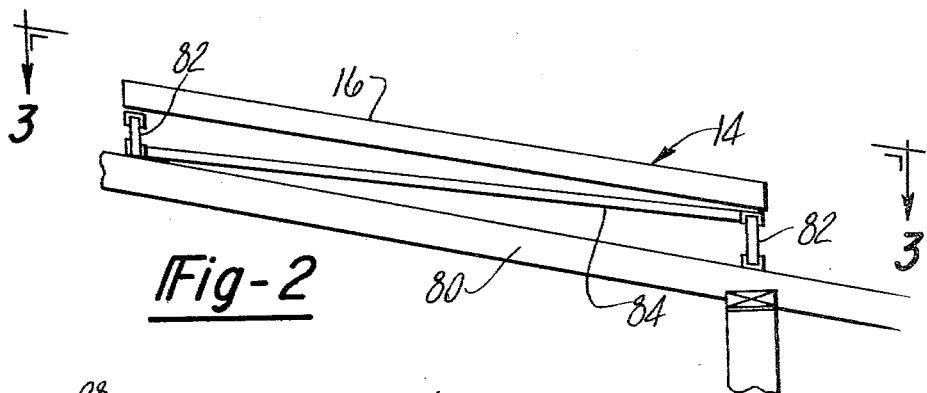
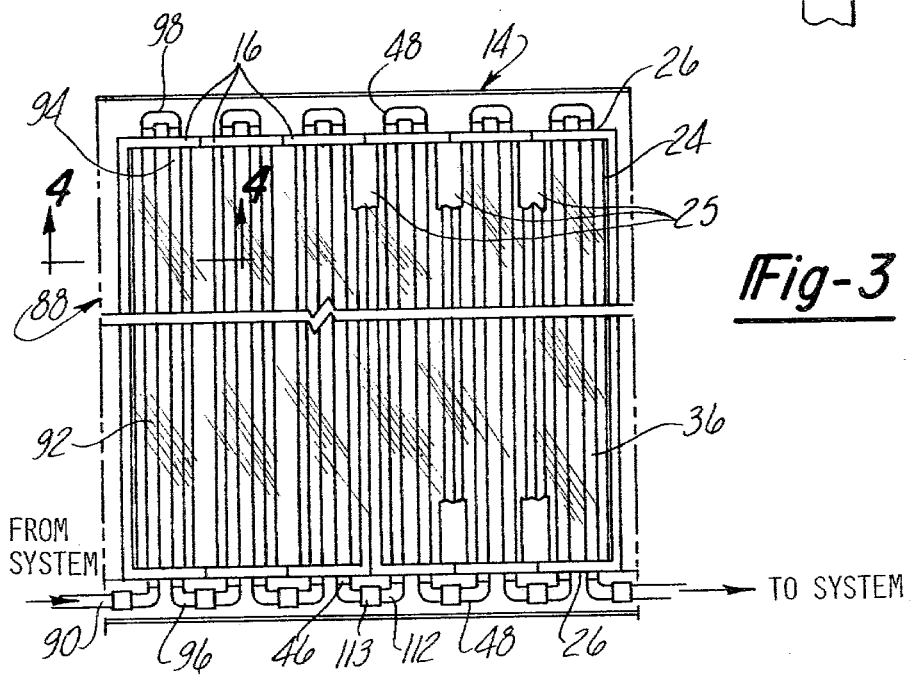

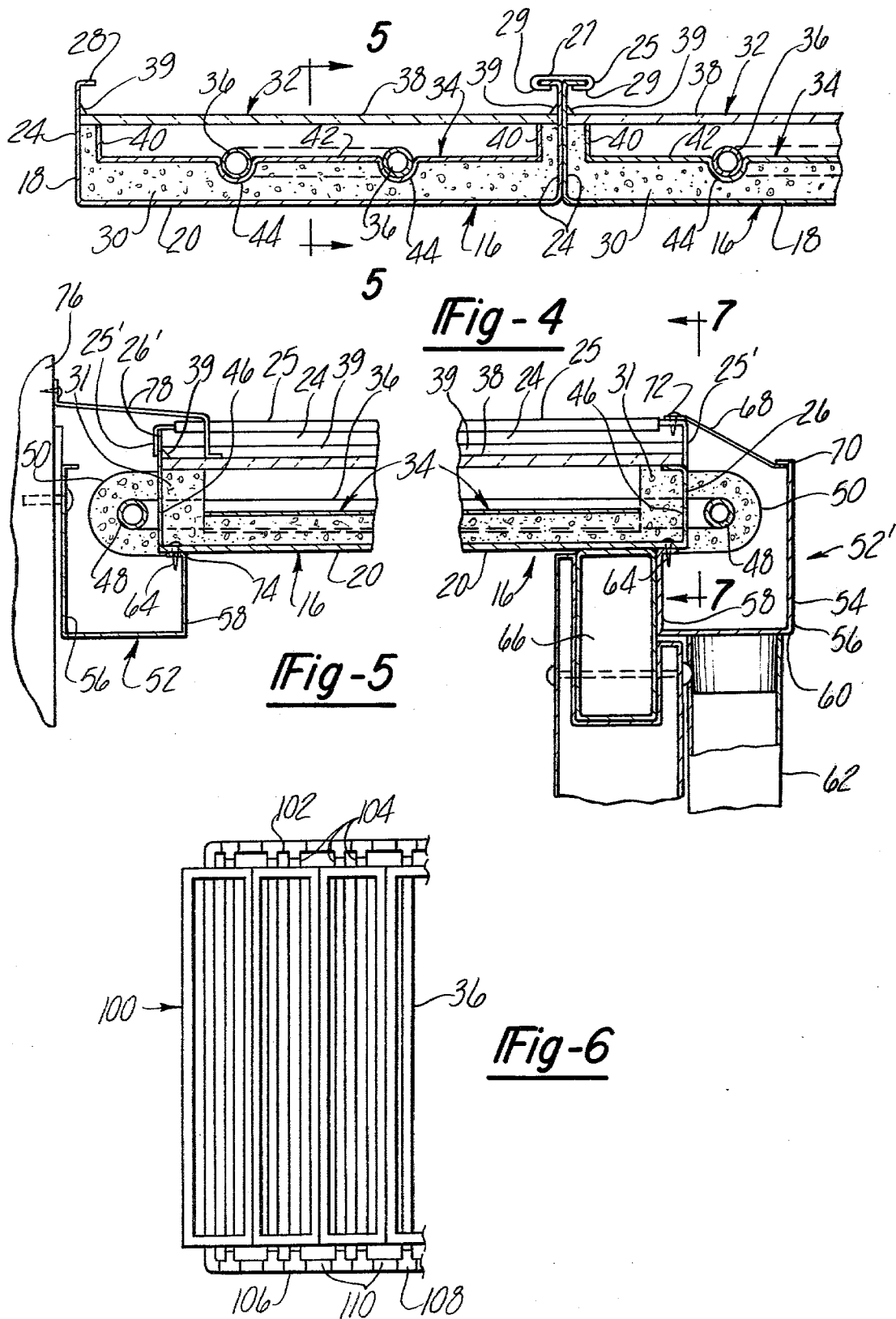

STRUCTURAL BUILDING COMPONENT

BACKGROUND OF THE INVENTION

The diminishing availability of fossil fuels, such as coal, oil and natural gas, as a primary energy source has spurred the development of systems utilizing alternate energy sources. Among these are solar radiation, nuclear power, wind energy, geothermic sources and even tidal currents. Much attention is now being directed to solar energy and may systems utilizing same are already availabe to businesses and homeowners. For many areas of the United States solar heating systems must be supplemented by conventional heating means because of inefficient heat transfer and heat storage and limited availability of sunlight; nevertheless, great success has been achieved in the use of solar energy for providing hot water, heating swimming pools and providing a moderate amount of heating and cooling for homes and buildings. However, there is a need of simplifying and improving the solar heat gathering components, to facilitate assembling, as well as making repairs in case a leak develops, and it is to this end that the present invention is directed.

As is generally true with new technological developments, most current solar energy systems are beyond the assembling capability and technical knowledge as well as the financial resources of average homeowners because of initial production costs, research, development, and assembly expenses. In addition to the cost factor, the complexity of most available solar systems necessitates installation by personnel skilled in this field. On the other hand, with my improvements, highly trained solar heat specialists are not needed to install same, but rather ordinary mechanics and plumbers can handle the whole assembly and installation procedure. Another disadvantage encountered with a complex solar panel assembled in the factory and shipped to a job site for installation, has been that there is danger of damage to the panel in transit and loosening of connectors ultimately resulting in leakage. Also, once a solar panel system is installed it may be desirable to add to the system, should increased capacity or building enlargement be called for. To prevent water infiltration into the spaces between abutting panels, a positive seal is needed between adjoining sections to forestall this leakage, as well as possible corrosion and loss of efficiency.

SUMMARY OF THE INVENTION

The present invention addresses itself to the basic shortcomings of present solar energy collection devices and provides a structural building component integrating solar panels into a composite structure independently usable, or if desired, forming part or all of the roof or sun facing walls of a building or additions thereto.

An object of the present invention is to provide a structural building component utilizing panels, some of which are, "active" and provided with means to collect solar radiant energy while others may be "passive" panels which, if desired, may be later replaced by "active" panels.

Still another object of the invention is to provide a solar heat collection panel system adaptable to be either a unidirectional, or parallel, flow system or a series circulating system by use of different connecting elements but utilizing the same basic unit panel constructions.

A further object of the invention is to provide a structural building component panel adapted to be joined side by side to like panels, and in which all fluid conduit connections of such panels are made exteriorly of the ends of the panels during assembly and installation of the solar heating system.

A still further object of the invention is to provide a structural building component of a solar heating system in which adjacent panels of "active" and/or "passive" form are securely interlocked and positively sealed against water infiltration between same.

Yet another object of the invention is to provide a structural building component assembly including a drainage system concealing from view the exterior joints of the fluid flow members receiving solar heat, and capable of receiving any system leakage as well as that of atmospheric precipitation.

Another object of the invention is to provide a structural building component in modular form in which the latter may be conveniently handled and transported to a job site with little possibility of structural damage which would result in leakage, while allowing local "in place" assembly and joinder of the "active" modular units of the structural building assembly with minimal danger of leakage, while facilitating spotting of any leakage which may develop at any time.

Still another object of the invention is to provide a structural building component having a relatively low initial cost and which may be easily transported, to the point of use, installed and maintained.

More specifically, the present invention contemplates a structural building component, a plurality of which are joinable as a series of interlocking panels joined together by a clamping element which also serves to provide a watertight seal. Some of these panels are "active" in the sense that they contain solar energy absorbing means and, if desired, the balance of the panels may be "passive" in the sense that they do not contain such solar energy absorbing means. The solar energy absorbing means of each "active" panel preferably includes a translucent panel of glass or a glass substitute forming the top surface of the panel. The panel itself is a basically rectangular, and preferably has a lightweight aluminum shell having a bottom surface, end walls, and longitudinal sidewalls. At least one of the longitudinal sidewalls extends upwardly above the plane of the top surface of the solar energy absorbing elements of the panel and then inwardly toward the longitudinal axis of the panel to form a coupling means when placed in abutting relationship with an adjacent panel of like construction, and locked together by means of a clamping element as hereinafter described. The solar panels preferably include an energy absorbing plate which is supported upon a bed of insulation at its bottom surface and is insulated from the longitudinal side surfaces of the shell to minimize heat loss to the latter. Preferably two semicircular troughs or depressions are formed longitudinally of the energy absorbing plate to receive fluid conducting means, such as copper tubing, which is preferably joined thereto to facilitate heat transfer. Within the panels there are no connections made between adjacent segments of the fluid conducting means; however, such connections are made exteriorly of the ends of the panels. A manifold or equivalent type of connection joining the tubes, at the ends thereof, allows a unidirectional (parallel) flow system or, if desired, the same panels may be alternatively connected so as to be used with a series circulation system. In order to conceal the external connections of the fluid conducting means and to accommodate the reception of both leakage and normal rainwater drainage, a gutter system is provided which is preferably secured to the panels during final assembly of same. Circulation of the fluid in the tubular system is accomplished by means of a conventional pump and the heated fluid is directed to a storage tank or similar arrangement in conventional manner. It is to be noted that if, subsequent to initial installation, requirements change, then additional "active" panels or "passive" panels may be readily added to, removed, or substituted for those already in place with minimal alteration of the composite structure.

Still further objects and advantages of the invention will appear as the description proceeds.

IN THE DRAWINGS

FIG. 1 is a schematic side elevational view of a building structure embodying this invention;

FIG. 2 is a fragmentary side elevational view of a building structure embodying a modification of the present invention;

FIG. 3 is a fragmentary plan view of a series fluid flow arrangement taken in the plane indicated by line 3—3 of FIG. 2, looking in the direction of the arrows;

FIG. 4 is a fragmentary transverse sectional view taken in the plane indicated by line 4—4 of FIG. 3, looking in the direction of the arrows;

FIG. 5 is a fragmentary longitudinal sectional view showing the terminal ends of the construction shown in FIGS. 1 and 4, looking in the direction of the arrows along line 5—5 of the latter;

FIG. 6 is a fragmentary plan view of an alternate construction of the present invention but showing a parallel fluid flow arrangement;

Figure 7:
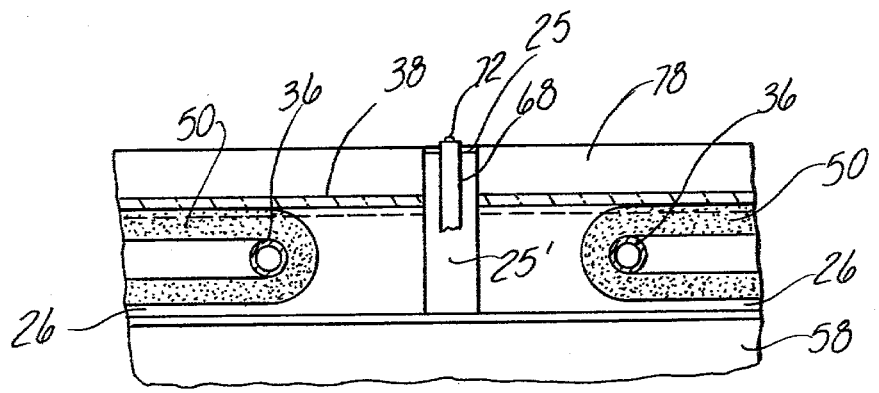
FIG. 7 is a fragmentary cross sectional view taken in the plane indicated by the line 7—7 of FIG. 5, looking in the direction of the arrows.

A preferred example of the present invention is shown in the drawings and diagrammatically in FIG. 1 wherein a building structure, such as a porch or car port, is schemmatically shown at 10 embodying the present invention. The roof 12 of the building structure 10 is fabricated of structural components 14 in the nature of a series of interlocking panels 16, FIG. 4, preferably inclined so as to receive, on sunny days, the maximum radiant solar energy. Commonly, the angle of inclination increases in the northern latitudes to provide better solar energy reception.

Generally speaking, the structural building components 14 superimposed on or used to construct sun ray receiving roof or outer walls of a building include a series of interlocking panels 16 securely joined together in a manner shown in cross-section in FIG. 4 and which will later be described in detail with alternates. The panels are provided in two basic types identified as "active" and "passive" for sake of clarity. The "active" panels are adapted to receive heat energy in the form of solar radiation, and through the process of conduction transfer this heat energy to a fluid medium with this heated fluid to be directed to a place of storage or immediate utilization. On the other hand, the "passive" panels perform a mere structural function in that their primary purpose is to complete a roof or wall of a building, part of which may also be constructed of the "active" panels. The "active" panels are designed with significant system flexibility, since the fluid conducting means 36, FIG. 4, of the same panels 16 are adapted to be connected one to the other either in series, FIG. 3, or in parallel, FIG. 6. It is toward this end, and an important feature of this invention, that all connections between the fluid conducting means 36 carried by interlocking panels 16 are made externally of the panels.

Figure 8:
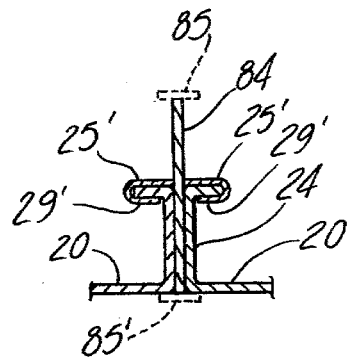
FIG. 8 shows in cross section the use of a modified form of clamping element or cleat which may be used between the interlocking panels to provide additional strength and sag resistance for said panels.

A drainage assembly, FIG. 5, may be provided to catch and divert any fluid leakage away from the system and to facilitate the ready location of the point of origin of any such leaks. In more detail, the system of structural building components 14 includes a series of individual interlocking panels 16, FIG. 4, preferably having a width of approximately one foot, a length of from eight to ten feet and a height of approximately three inches. For longer panels, this height could be increased to stiffen same, or reinforced with a cleat beam 84 as shown in FIG. 8. This cleat beam 84, preferably in the form of an extrusion, will take the place of the clamping element 25, and if desired may have stiffening flanges 85 and 85'.

With reference to FIG. 4, the individual interlocking panels 16 preferably have a sheet metal or plastic shell 18 formed so as to provide a bottom wall 20, side walls 24, and end walls 26 and 26', FIG. 5. The outer surface of the bottom wall 20 may be provided with a suitable finished surface so as to produce an attractive ceiling or inner surface for some types of building structures where same is exposed to view. The longitudinally extending side walls 24 extend above the terminal edges of the transversely extending end walls 26 and 26', FIG. 5, and terminate, FIG. 4, in an inwardly directed leg portion or flange 28 which preferably is substantially parallel to the bottom wall 20 of the interlocking panel 16. A suitable metal for shell 18, of the many useable, is aluminum in sheet form with a thickness of approximately 0.032 inches which is lightweight, durable, and readily formable. Aluminum also has the additional advantage of being commercially treatable by anodizing, painting, enameling, et cetera, so as to be available with a great variety of attractive surfaces, which is a desirable advantage, should the bottom outer surface of the panels be used to form the finished ceiling or wall of a structure. The end wall 26, FIGS. 5 and 7, is preferably turned inward at its top to form a support for translucent panel 38 and facilitate rain water flow over panel 38 and into gutter 54. Upper end wall 26' preferably extends above translucent panel 38, to facilitate directing rain water toward the lower end of panel 38. The panel 38 is preferably provided with a sealing means or gasket 39, to facilitate keeping rainwater from leaking under panel 38, FIGS. 4 and 5.

The "active" panels are preferably provided with a bed of suitable insulation material 30 with an R factor (a standardized measure of insulating ability) determined on the basis of the geographic locality and upon the particular type of building structure, with poly isocyanurate insulation being a preferred one. The insulating material 30 may extend upward along the peripheral walls 24, 26 and 26' of the interlocking panel 16. Instead of this insulating material 30 extending to end walls 26 and 26', insulating blocks 32 are preferably used at the ends of interlocking panels 16 to provide end stops for energy absorbing plate 34. A solar radiation absorbing means 32 is provided in the "active" panels including an energy absorbing plate 34, fluid conducting means 36 and a panel 38 which may be transparent or translucent as desired. In the preferred embodiment, the energy absorbing plate 34, FIG. 4, comprises a heat receiving and transferring sheet of copper or aluminum having upturned side edges 40 and a bottom wall 42. The bottom wall 42 is provided with spaced apart semicircular trough-like depressions 44, FIG. 4, extending its entire length. In conductive relationship with said energy absorbing plate 34 are tubular fluid conducting means 36 which may be in nature of copper tubing having a length greater than that of the interlocking panel 16 and extending through the transverse end walls 26 and 26' of the panel 16 through annular openings 46 provided therein. The fluid conducting means 36 may, if desired, be secured within the trough-like depressions 44 by means of welding, soldering, brazing, or the like. The top surface of the solar radiation absorbing means 32 preferably comprises a sheet of light transmitting material 38 such as breakage resisting glass, plexiglass, or suitable equivalent.

Transversely extending external connections 48, FIG. 5, between adjacent sections of fluid conducting means 36 are preferably provided with a covering of substantially water proof insulation 50. This insulation 50 covering serves to minimize heat loss to the atmosphere. Another possible source of heat loss is through thermal contact between the transversely extending end walls 26 and 26' of the panel 16 wherein there are provided annular openings 46 through which extend the fluid conducting means 36. A rubber grommet (not shown) may be provided within this opening 46 to minimize the heat loss effect between the end walls 26 and 26' of shell 18 and the tubular fluid conducting means 36.

Where the structural building component 14 forms the roof 12 of a building, FIG. 1, there may be provided a drainage assembly 52 and 52' at both ends of 14, FIG. 5, to accommodate normal water runoff and also serve to receive and conduct any leakage developed from the fluid conducting means 36. Since all fittings and connections between the adjacent segments of the fluid conducting means 36 are made outside of the interlocking panel assemblies 16 and within drainage assemblies 52 and 52', it is improbable that any leakage will occur within the tubing of panels 16, which are substantially waterproof. It is also desired that the drainage assembly 52' be so located as to conceal the exteriorly protruding connecting segments 48, FIG. 5, of the fluid conducting means 36 so as to present an attractive view. As shown in FIG. 5, the lower drainage assembly 52' may comprise an extruded channel-shaped gutter 54 having side walls 56, 58 and a bottom surface 60. To the bottom surface 60 may be connected a conventional downspout arrangement 62. The side walls 58 of the drainage assemblies 52 and 52' may extend upwardly to the bottom surface of the panels 16 and may be secured by means of fasteners 64 to the panel 16 itself or, alternatively (not shown), at the lower end of the assembly 52' to the transversely extending beam member 66, FIG. 5, upon which the panels are supported. The outer side wall 56 may extend upwardly beyond the top edge of the inner side wall 58 to a point approximately coplanar with the highest point of the insulation 50 to provide a neat external appearance. Supporting braces 68 are provided at spaced intervals at the top of drainage assembly 52' and conventionally secured to an inwardly extending lip portion 70 of the outer side wall 56 while the other end 72 may be secured to the top edge of the clamping element 25 of the interlocking panel assembly 16. Since the roof structure 12 will be provided with a slope whose angle may be varied as desired, and preferably in accordance with the particular geographic latitude so as to maximize the collection of the radiant energy of the sun's rays which strike the earth at different angles dependent upon latitude, this also causes rain water or melting snow to be directed toward and into outer gutter 52' and then into downspout 62. The inner gutter 52 normally will have the same basic configuration as the outer gutter 52'; however, if desired it may serve the additional function of supporting the inward edge 74 of the panel assembly 16. Gutter 52 would be provided with a downspout connection (not shown) in conventional manner to drain any leakage or water.

Not shown in the drawings, FIG. 5, is an additional transversely extending beam member which may be used to support the upper edge of the roof structure 12. The particular building structure 10 shown in FIGS. 1 and 5, may be, if desired, provided adjacent a pre-existing building and may serve as a porch, carport, shed, or garage. The inner gutter 52 may be secured in conventional manner to an exterior wall 76 of the pre-existing building and may be provided with a covering strip 78, preferably removable for inspection purposes, and extending the entire length of the inner gutter 52 and enclosing it, so that any rain water would be directed toward the outer gutter assembly 52'.

As shown in FIG. 2, when the panel construction 16 is added to and supported on an existing roof 80 of a building, or attachment thereto, having its own drainage system it is not necessary that the aforementioned special drainage system be provided, unless a special appearance is desired. If desired, the exterior insulation 50, FIG. 5, may be spray painted in a fashion desired to complement the color scheme of the building.

Heat dissipation through thermal contact with the existing roof 80, FIG. 2, may be avoided by spacing the panel construction 16 apart from the roof 80. Referring again to FIG. 2, a pair of upper and lower transverse beams 82, joined and fixedly spaced apart by an intermediate member 84, support the lateral (upper and lower) ends of the structural components 14 above the roof 80 thereby providing an insulating layer of air and minimizing heat loss to roof 80.

In FIG. 3 is illustrated a plurality of panels 16 aligned in abutting side-by-side relationship and interlocking by means of elongated clamping elements or cleats 25 having an intermediate portion 27, FIG. 4, with a width approximating the overall combined width of two inturned leg portions 28 of interlocking panels 16. Lateral edges 29 are bent inwardly, parallel to said intermediate portion 27 to form facing channel portions gripping leg portions 28 of adjacent panels. In the preferred embodiment, the clamping element 25 extends the entire length of the panels 16 thereby providing a barrier against the infiltration of water between the abutting sidewalls 24, FIG. 4, of adjacent panels 16. After sliding clamping element 25 in place, its ends 25' are bent down, FIGS. 5 and 7, which firmly holds transparent panel 38 against endwise movement and also prevents relative movement of adjacent panel 16. Such structural integrity is a significant design factor in applications wherein the panels 16 constitute the roof of a structure and water infiltration is to be avoided. In different applications, such as a pre-existing roof diagrammatically shown with solar energy panels mounted thereon (FIG. 2), shorter, spaced apart segments of clamping elements 25 may prove adequate to interlock the panels.

As noted above, the joining of adjacent panels 16 is accomplished by endwise driving a clamping element 25 over the inwardly extending leg portions 28 of the sidewalls 24 of the adjacent panels 16. A tight fitting relationship between the clamping element 25 and the legs 28 of interlocking panels 16 is envisioned to prevent rain leakage as well as lateral and transverse relative movement between the cojoined sidewall panels 24 of interlocking panels 16.

Once the panels have been aligned in coplanar relationship and secured as described above, the fluid conducting means 36 extending exteriorally of the panels 16 through annular openings 46 in end walls 26, FIG. 5, may be cooperatively connected, FIGS. 3 and 6. The particular construction of the present invention, and one of its major advantages over available systems, is that the panels 16 may be operationally connected to form either a series, FIG. 3, or a parallel, FIG. 6, flow pattern. Of course, a combined series-parallel system may also be constructed if desired.

A series connection 88, FIG. 3, between adjacent segments of fluid conducting means 36 may be accomplished by securing suitable U-shaped connecting element 98 to the externally protruding segments of the fluid conducting means 36 by separable connectors, utilizing welding, soldering, compression fittings or similar means. A similar operative connection may likewise be made with a separable pair of elbow elements 112 and a short intermediate element 113, FIG. 3, therebetween.

With reference to FIG. 3, fluid is directed from a source to inlet conduit 90 where it flows upwardly through first fluid conducting means 92 to the top of the panel where connecting element 98 of any suitable type reverses the direction of fluid flow downward through adjacent fluid conducting means 94. At the bottom of the panel, connecting element 96 directs the fluid out of the outmost panel 16 to the immediately adjacent panel 16 where the direction of flow is once again upward. The fluid thus flows in a serpentine series path through the entire structure until it exits the system.

A parallel flow system 100 is illustrated in FIG. 6, constructed by securing an inlet manifold assembly 102 and an outlet manifold assembly 106 to the externally extending segments of the fluid conducting means 36. The manifold assemblies 102, 106 may be of unitized construction or may also be formed with a plurality of T-shaped connectors 108 joined by short straight segments of tubing 110. In this arrangement, the fluid conducting means 36 form parallel branch circuits 104 receiving fluid from the inlet manifold 102 and directing it through the panels 16 to the outlet manifold 106 which is preferably disposed at a higher elevation than the inlet manifold 102 because of the slope of the roof 12.

It should be observed that passive panels may be located anywhere within the system; although, the usual location would be the end of the system most distant from the fluid source so as to shorten the fluid flow path and thus help minimize heat loss in transit and to facilitate any subsequent replacement of passive panels with active panels to increase the system's operational capabilities.

The basic panel 16 is adapted, as noted, to provide either a series or a parallel flow pattern dependent upon the type of connecting elements utilized and the flow pattern chosen. In addition to this initial flexibility, subsequent modifications may be made to the installation by removing either the series or parallel connecting elements and replacing them with the other. This feature enables changes in the heat transfer load imposed upon the system to be accommodated without the necessity of replacing the entire panel assembly.

From the foregoing description of the invention it should be seen that there is provided a structural building component in modular form having a series of interlocking panels clamped together in a secure relatively watertight manner. The longitudinal sidewalls 24, FIG. 4, of the shell portion 18 of each panel extends upwardly and terminates in an inwardly directed leg portion 28 to which the clamping means 25 are secured. Some, if not all, of the panels include solar energy absorbing means comprising a bed of insulation 30, an energy absorbing and conducting plate 42, preferably of a metal with good heat conducting properties, a fluid conducting means 36 and a top surface of the solar heat passing translucent material 38. The tubular fluid conducting means extends through the transverse sidewalls 26 and 26' of the shell portion 18 where they are joined by connecting elements 48, FIG. 3, exteriorly of the panels. In order to minimize the possibility of the circulating fluid damaging the inside of the panels through leakage, there are no connections made in the interior of the panels. As noted above the connecting means may be modified so as to provide either a series or a parallel fluid flow pattern. The connecting elements and the protruding segments of the fluid conducting means may be provided with a jacket of insulation 50, FIG. 4. A drainage assembly 52' is provided which serves to conceal the exteriorly projecting sections of the fluid conducting system and to provide a flow path for any leakage which may develop in the joints of the fluid conducting system, and also to serve the general function of accommodating and passing to downspout 62 the normal atmospheric precipitation. When the component assembly is used in the construction of a carport, garage or similar structure adjacent a pre-existing building, the drainage assembly may comprise a first gutter means 52' at the lower end of the roof and a second gutter means 52 at the higher end of the roof securable to the pre-existing building. A circulating pump 86, FIG. 1, may be used to circulate the solar heat receiving fluid through the fluid conducting tubing 36 to a point of immediate use or storage, (not shown) and return for further heating, in accordance with conventional practice.

The embodiments of the invention in which an exclusive property or privilege is claimed are defined as follows:

1. A building structure assembly comprising; a plurality of elongated panel assemblies disposed in abutting side by side relationship, each of said panel assemblies including an elongated shell member having parallel spaced bottom and top walls, parallel spaced side walls and end walls, said side walls extending upwardly above the plane of said top wall and having inwardly directed leg portions, an elongated clamping element having facing channel portions engaging oppositely extending leg portions of adjacent panels to prevent relative transverse movement of said adjacent panels, said clamping element extending over the opposite ends of said panel assemblies and presenting portions engaging the ends of adjacent panels to prevent relative longitudinal movement of adjacent panels, solar energy absorbing means associated with one of said panel assemblies, said energy absorbing means comprising an energy absorbing plate member having a bottom wall and upturned side edge portions extending in parallel spaced relationship to said bottom wall and pair of side walls, respectively, of said one of said panel assemblies to form an insulating cavity therebetween, heat insulating means in said insulating cavity, and a transparent panel forming said top wall member of said one panel assembly, heat transfer means including a fluid conducting means supported on said plate member in heat transfer relation therewith and extending longitudinally of said one panel assembly for circulating fluid in heat transfer relationship to said plate member, said fluid conducting means extending through opposite end walls to the exterior of said panel assembly for connection to fluid conveying manifolds, a pair of drainage structures disposed at opposite ends of said plurality of panel assemblies and being fastened to each of said panel assemblies, said drainage structures each having a gutter portion adapted to conceal the exposed portions of said fluid conducting means and manifolds to provide a flow path for receiving drainage of fluid leakage from said fluid conducting means.

2. A building structure assembly according to claim 1 wherein solar energy absorbing means and heat transfer means are provided in at least two panel assemblies and wherein portions of said fluid conducting means at the exterior of corresponding ends of said pair of panel assemblies are connected together by said manifolds.

3. The combination of claim 1 wherein one drainage structure of said pair of drainage structures is disposed at a lower elevation to receive atmospheric precipitation accumulating on said top wall and directed to said one drainage structure.

* * * * *

UNITED STATES PATENT AND TRADEMARK OFFICE
CERTIFICATE OF CORRECTION

PATENT NO. : 4,245,621
DATED : January 20, 1981
INVENTOR(S) : George E. Hollobaugh It is certified that error appears in the above—identified patent and that said Letters Patent is hereby corrected as shown below:

Column 4, line 66, "block 32" should read --blocks 31--

Signed and Sealed this

Sixteenth Day of February 1982

[SEAL]

Attest:

GERALD J. MOSSINGHOFF

Attesting Officer     Commissioner of Patents and Trademarks